3,189,656
MANUFACTURE OF HALOGENATED ALCOHOLS
Joseph Gordon and Cyril Woolf, Morristown, N.J., assignors to Allied Chemical Corporation, New York, N.Y., a corporation of New York
No Drawing. Filed Oct. 4, 1961, Ser. No. 142,784
4 Claims. (Cl. 260—633)

This invention is directed to sym-tetrafluorodichloroisopropanol, $CClF_2.CH(OH).CClF_2$, and its one water hydrate, $CClF_2.CH(OH).CClF_2.H_2O$, and to processes for making the same.

Objects of the invention are to provide the foregoing new products, and to afford commercially feasible, easily controllable methods for effecting reduction of perhalogenated ketones by elemental hydrogen to form certain fluorochloroalcohols.

According to the invention, it has been found that when sym-tetrafluorodichloroacetone, $CClF_2.CO.CClF_2$, is subjected to the action of hydrogen in the presence of a particular catalyst, and at superatmospheric pressure, and under other herein described reaction conditions, the above indicated sought-for products may be obtained in good yields, halogen release from the organic starting material is minimized, and catalyst poisoning correspondingly reduced.

Sym-tetrafluorodichloroacetone at ordinary conditions is a substantially colorless liquid of the composition $CClF_2.CO.CClF_2$ and having boiling point of about 44° C. This compound may be made for example by effecting reaction between anhydrous HF and hexachloroacetone at moderately elevated temperature while in the presence of antimony pentahalide, and while maintaining the reaction mass substantially in the liquid phase, and thereafter recovering the $CClF_2.CO.CClF_2$ from the reaction products by suitable procedure such as distillation. U.S.P. 2,741,634 of April 10, 1956 discloses suitable procedure for making sym-tetrafluorodichloroacetone, $CClF_2.CO.CClF_2$.

Practice of the present invention comprises a liquid phase reaction involving subjecting $CClF_2.CO.CClF_2$ to the action of hydrogen at relatively low temperatures and in the presence of a relatively small amount of a certain platinum catalyst and at moderately low superatmospheric pressures. Quantities of hydrogen and catalyst, and temperature and pressure and reaction time are conjunctively chosen so that each may be high enough to effect substantial reaction of $CClF_2.CO.CClF_2$ to form $CClF_2.CH(OH).CClF_2$ and/or the hydrate. Reaction appears to proceed along the lines of

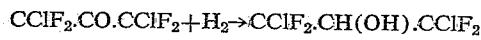
$$CClF_2.CO.CClF_2 + H_2 \rightarrow CClF_2.CH(OH).CClF_2$$

The invention process includes procedure in which the starting materials and the products formed, i.e. all materials in the reaction zone except the hydrogen, are maintained substantially in the liquid phase. Apparatus employed may be a simply constructed and operated autoclave, made for example of stainless steel, nickel or Monel, and provided with an opening adapted for charging starting material and discharging reaction product, agitation or shaking facilities, a valve-controlled gas vent, and suitable hydrogen under pressure storage, pipe and valve arrangements adapted to facilitate, during progress of the entire reaction, feed of hydrogen gas under superatmospheric pressure to the interior of the autoclave and maintain therein the desired pressure.

Operating factors involved in practice of the invention include a particular catalyst, and concentration of the catalyst on the basis of the weight of the $CClF_2.CO.CClF_2$ starting material charged to the process, superatmospheric pressures and degrees thereof; temperatures; and reaction time.

The catalyst employed is the known so-called Adams platinum catalyst. This catalyst and methods for making the same are described in detail on pages 463–470 of "Organic Synthesis, Collected Vol. I" by Gilman and Harris, John Wiley & Sons, Inc., New York, 1946. Briefly, the catalyst is made by fusion of sodium nitrate and chloroplatinic acid. The catalyst before use is a brown, heavy granular material considered to be $PtO_2.H_2O$ (platinic oxide). In the more usual practice, and as is preferred herein, at the outset of a reaction, the catalyst is initially charged in the $PtO_2.H_2O$ form indicated. During reaction in the presence of hydrogen the material becomes more or less converted to platinum black, i.e. metallic platinum. Accordingly, the active material is referred to as a platinum oxide-platinum black catalyst. After extended use, the catalyst may be reactivated or reconstituted as described in the publication.

The reactions of the invention are carried out preferably in the presence of a relatively low concentration of catalyst. More particularly, catalyst concentration, which is based on the weight of the $CClF_2.CO.CClF_2$ charged, may lie in the range of 0.25–5.0% by weight. High concentrations afford no marked yield increases, and preferably catalyst concentration is substantially in the range of 0.5–3%, and in more usual practice is of the order of one to 2%.

Successful practice of the invention process requires use of superatmospheric pressure which may be utilized at any value which, in conjunction with other operating factors, is at least high enough to maintain the reaction mass (except hydrogen) in liquid phase and to effect substantial reaction of the $CClF_2.CO.CClF_2$ organic starting material and hydrogen to form the sought-for products. Pressures may lie substantially in the range of 30–250 lbs. per square inch gauge, but are preferably in the range of 60–150 lbs. While maximum pressures do not appear to be particularly critical, pressures above about 150 lbs. per square inch gauge do not appear to serve any worthwhile purposes. The preferred minimum pressure of about 60 lbs. is somewhat associated with temperatures as below noted. It will be understood that pressure in the reaction zone is maintained by the pressure at which hydrogen is supplied thereto, duration of hydrogen feed being sufficient to satisfy the hydrogen requirements of the particular reaction at hand, end point of which is indicated by cessation of hydrogen utilization.

Temperatures may be those which, in conjunction with other operating factors, are high enough to effect substantial reaction of $CClF_2.CO.CClF_2$ and hydrogen. Maximum temperature in the reaction zone is preferably not more than 100° C., to enhance yields and to facilitate prevention of decomposition of sought-for products. Reaction proceeds significantly at temperatures which may be as low as 10° C. An operating advantage provided by the invention is that the reaction may be carried out, with adequately good conversions and yields, at about room temperature (20° C.) or a little higher. The organic starting material may be charged to the autoclave at room temperature, and on introduction of hydrogen under pressure, reaction proceeds without application of extraneous heat. Reaction is mildly exothermic, and during for example the first third or quarter of reaction time of a given batch, temperature may rise from say 5 to 15° C.

As noted, the $CClF_2.CO.CClF_2$ organic starting material has a boiling point of about 44° C. at atmospheric pressure. It has been found that reaction proceeds in the best manner, with regard to conversions and yields, where operating temperatures and pressures are such as to maintain substantially all the material in the reactor, i.e. the organic starting material and the conversion products formed, substantially in the liquid phase. The inherent substantially ambient temperature characteristics of the reaction facilitate maintenance of all materials in the reaction zone except hydrogen in the liquid phase. Particularly when extraneous heat is not supplied, temperatures in the reactor do not inherently exceed about 40° C. which is below the 44° C. atmospheric pressure boiling point of the organic starting material. Products of the invention are colorless liquids boiling substantially in the range of 103–112° C., and hence reaction zone temperatures should be not in excess of 100° C. as stated. With the preferred 60 lbs. minimum pressure value, even if it is desired to hasten reaction by application of external heat, conjunctive relation of pressure not less than about 60 lbs. and maximum temperature of about 100° C. provides maintenance of all materials in the reactor, other than hydrogen, substantially in the liquid phase as preferred for best practice. Hence, it will be understood that in the preferred embodiments, temperatures are ambient temperatures, and temperatures and pressures are correlated so as to maintain the organic starting material and the conversion products in the reactor substantially in the liquid phase.

As will be observed from the above, catalyst concentrations, pressures and temperatures are substantially variable. Hence, variations of these features jointly and severally affect reaction time, conversion and yield. Accordingly, reaction time is widely variable, and may be anything from say one to 24 hours, and is finally dependent upon the nature of the other variables. Keeping in mind for example, that within the limits described herein, increase in catalyst concentration, temperature, and pressure, and reaction time increase rate and extent of reaction, selection of optimum operating conditions with regard to all variables involved may be determined by test runs. Termination of a given reaction may be determined by cessation of hydrogen utilization.

At the end of reaction the autoclave may be vented thru a Dry-Ice tray to catch any vaporized starting material and reaction products, and the gaseous exit of the trap may be passed thru a water scrubber to facilitate determination of HCl formed during the reaction. After venting, the contents of the reaction zone may be filtered to separate out solid catalyst. The resulting crude filtered autoclave product comprises principally sought-for products and any unreacted $CClF_2.CO.CClF_2$, and contains no significant amount of other compounds. This crude material is a colorles liquid having boiling point in the range of about 45° C. up to a little above about 112° C.

In accordance with the invention, it has been found that the process described results in production of substantially anhydrous $CClF_2.CH(OH).CClF_2$, a colorless liquid boiling at about 111°–112° C., and the $$CClF_2.CH(OH).CClF_2.one\ H_2O$$

hydrate, a colorless liquid boiling at about 104°–106° C. The indicated products may be recovered from the crude autoclave product by distillation. Thus, the autoclave product may be distilled at substantially atmospheric pressure under conditions to take off a forerun boiling substantially in the range of e.g. 45° C. up to 103–104° C. This forerun comprises unreacted starting material and possibly a small amount of the alcohol hydrate. Distillation may then be continued to recover as condensate, and as a product of the invention, a fraction boiling substantially in the range of 103°–104° C. up to about 112°–113° C. This fraction constitutes a mixture of $CClF_2.CH(OH).CClF_2$ and its indicated hydrate, these materials being present in approximately equal proportions. If separate recovery of the hydrate is desired, distillation of the 103°–104° C. to 112°–113° C. fraction may be effected accordingly.

It has been found that all of the $CClF_2.CH(OH).CClF_2$ constituent of the above 103°–104° C. to 112°–113° C. fraction may be recovered as substantially anhydrous $CClF_2.CH(OH).CClF_2$, by redistilling such fraction in the presence of a suitable dehydrating agent. For example, 96% sulfuric acid may be added directly to the fraction before distillation, quantity of acid being by volume about half that of the hydrate content of the hydrate. On distillation of the liquor to which the dehydrating agent has been added, there is recovered a fraction having the approximate boiling point of 111°–112° C. which is the anhydrous $CClF_2.CH(OH).CClF_2$ product, and which consists of the entire $$CClF_2.CH(OH).CClF_2$$

constituent of the fraction.

In the following examples, unless otherwise indicated, parts are by weight. Conversion is intended to indicate the percent by weight of organic starting material which reacted, and yield indicates percent by weight of reacted starting material which is changed to sought-for products. Pressures indicated are in terms of pounds per square inch gauge.

*Example 1.*—Catalyst employed was the so-called Adams catalyst which was made substantially as described on pages 463 and 464 in the above noted publication. Briefly, 70 parts of a 5% platinic chloride solution and 35 parts of $NaNO_3$ were fused at about 530–540° C. After about 30 minutes of heating, the mass was cooled and water was added to wash out soluble salts. About 1.5 parts of brown solid catalyst material was obtained, and in the following run the catalyst as initially charged to the reaction was in the form of $PtO_2.H_2O$. 100 parts of sym-tetrafluorodichloroacetone, $CClF_2.CO.CClF_2$, and one part of the catalyst were charged into a steel autoclave at about room temperature. Over a period of about 8 hours, during which time the reactor was shaken continuously, hydrogen was continuously fed into the reactor under conditions to maintain therein a pressure in the range of about 80–100 lbs. During about the first two hours, temperature in the reactor rose about 10° C. After about eight hours of total reaction time, the autoclave was vented through a Dry Ice-acetone cooled trap, non-condensed gases were scrubbed with water, and no low boilers were observed. The scrub water contained only traces of chloride ion. The liquor in the autoclave was filtered to separate catalyst, and 93 parts of crude autoclaved product were obtained. This crude material was distilled at substantially atmospheric pressure, and after removal of a forerun of about 10.5 parts boiling up to about 104° C., there were obtained about 77 parts of condensate boiling substantially in the range of 104–112° C., and about 6 parts of still residue boiling above about 112° C. The 104–112° C. fraction included about 24 parts boiling substantially in the range of 104–106° C., and about 29 parts boiling substantially in the range of 111–112° C. Conversion was about 89.5%. Analysis work, including infrared spectrograms, which showed the presence of alcohol and hydrate groupings and the disappearance of the keto group, demonstrated that the 77 parts of material boiling substantially in the range of 104–112° C. was a mixture of sym-tetrafluorodichloro-isopropanol, $CClF_2.CH(OH).CClF_2$, and its one water hydrate, $CClF_2.CH(OH).CClF_2.H_2O$. Yield of the mixture of the isopropanol and its hydrate was about 86%. The 77 parts of the isopropanol and its hydrate mixture were redistilled in the presence of 50 parts of 96% strength sulfuric acid. The hydrate was converted to the anhydrous material, and there were obtained as condensate about 70 parts of a colorless liquid with a pungent odor, boiling in the range of about 111–112° C., which material was identified by analysis means above noted to be substantially anhydrous $$CClF_2.CH(OH).CClF_2$$

Yield of the anhydrous product was about 78%. The above 104–112° C. boiling mixture was soluble with shaking in water. Seperate 104–106° C. and 111–112° C. fractions, from mixtures substantially the same as the above composite mixture, were identified by analysis work including infrared, conversion to acetate and urethane, to be respectively CClF$_2$.CH(OH).CClF$_2$.H$_2$O and CClF$_2$.CH(OH).CClF$_2$. Other analysis work with respect to the 111–112° C. CF$_2$Cl.CH(OH).CClF$_2$ fraction showed percent F calculated 37.8, found 36.3; percent Cl calculated 33.8 found 35.3: and with regard to the 104–106° C. CClF$_2$.CH(OH).CClF$_2$.H$_2$O fraction showed percent F calculated 34.7, found 34.7, and percent Cl calculated 32.4, found 32.6

*Example 2.*—The catalyst employed was commercially available Adams catalyst, and as initially charged to the reaction was in the form of the solid, brown PtO$_2$.H$_2$O. About 500 parts of CClF$_2$.CO.CClF$_2$ and five parts of the catalyst were charged into a steel autoclave at temperature initially about 28° C. Reaction time was about 8 hours, and the reactor was shaken continuously. Hydrogen was continuously fed into the reactor to maintain therein a pressure of about 83 lbs. After about 10 minutes, temperature in the reactor rose to about 36° C., and maximum temperature of 38° C. was reached in two hours. The autoclave was vented after eight hours thru a Dry Ice-acetone cooled trap, and non-condensed gases were found to contain 0.098 mol of chloride. The liquor in the autoclave was filtered to separate catalyst, and 429 parts of crude autoclaved product were obtained. This crude material was distilled at substantially atmospheric pressure and after removal of a forerun of about 55 parts boiling up to about 103–104° C., there were obtained about 336 parts of condensate boiling substantially in the range of from 103–104° C. to 112° C., and about 32 parts of still residue boiling above about 112° C. Conversion was about 80%. Analysis work substantially the same as described in Example 1 showed that the 336 parts of material boiling substantially in the range of 103–104 to 112° C. was a mixture of CClF$_2$.CH(OH).CClF$_2$ and its hydrate $$CClF_2.CH(OH).CClF_2.H_2O$$

Yield of the alcohol and hydrate was about 67%. The 336 parts of the isopropanol and its hydrate mixture were redistilled in the presence of about 150 parts of 96% strength sulfuric acid, and there were obtained as condensate about 310 parts of colorless liquid boiling in the range of about 111–112° C., which material was identified by infrared and other analysis as above described to be substantially anhydrous.

$$CClF_2.CH(OH).CClF_2$$

Yield of the anhydrous product was about 77%.

*Example 3.*—The catalyst employed was a fresh quantity of the catalyst of Example 2. 250 parts of $$CClF_2.CO.CClF_2$$

and five parts of catalyst were charged into the autoclave, operation otherwise being substantially the same as in Example 2. On filtration of the liquor in the autoclave, 205 parts of crude autoclaved product were obtained. This crude material was distilled at substantially atmospheric pressure and after removal of a forerun of about 13 parts boiling up to about 103° C., there were obtained about 186 parts of condensate boiling substantially in the range of about 103° C. to 111–112° C., and about 33 parts of still residue boiling above about 111–112° C. Conversion was about 95%. Analysis as above showed that the 186 parts of material boiling substantially in the range of 103 to 111–112° C. was a mixture of CClF$_2$.CH(OH).CClF$_2$, and its hydrate $$CClF_2.CH(OH).CClF_2.H_2O$$

Yield of the alcohol and hydrate was about 78%.

*Example 4.*—A quantity of used, more or less spent and more or less black catalytic material from previous runs was dissolved in aqua regia, filtered, and the filtrate evaporation residue was fused at 500–520° C. with NaNO$_3$. The fusion product was cooled, water washed and dried. Four parts of the thus reconstituted PtO$_2$.H$_2$O catalyst, and 400 parts of CClF$_2$.CO.CClF$_2$ were charged into the autoclave at temperature of about 30° C. Reaction time was about one hour, temperature rose to about 37° C., and pressure was held at about 85 lbs. Operation otherwise was substantially the same as in Example 2. On filtration of the liquor in the autoclave, 320 parts of crude autoclaved product were obtained. This crude material was distilled at substantially atmospheric pressure and after removal of a forerun of about 141 parts boiling up to about 103° C., there were obtained as condensate and still residue and hold up, about 175 parts of liquid boiling substantially in the range of about 103° C. up to a little above 112° C. Conversion was about 64%. Analysis showed that the 175 parts of material boiling substantially in the range of 103–112° C. was a mixture of $$CClF_2.CH(OH).CClF_2$$

and its hydrate, CClF$_2$.CH(OH).CClF$_2$.H$_2$O. Yield of the mixture of the isopropanol and its hydrate was about 68%.

In runs such as those of Examples 3 and 4 and other similar runs, in instances where the isopropanol and its hydrate mixtures were redistilled in the presence of sulfuric acid as described, yields of the anyhdrous $$CClF_2.CH(OH).CClF_2$$

of the order of 60–80% were obtained.

The above described sym-tetrafluorodichloroisopropanol is a notably satisfactory intermediate for use, e.g. in the manufacture of ester lubricants. To illustrate, the anhydrous alcohol may be reacted with phthalyl chloride to form the phthalate diester of the alcohol, substantially as follows.

*Example A.*—To 300 g. (1.49 mols) of the above described dichlorotetrafluoroisopropyl alcohol, 139 g. (0.68 mol) of phthalyl chloride were added slowly over a period of about 2 hrs. The mixture was stirred at room temperature for about 2 hrs., and heated at total reflux for about 9½ hrs. The evolved hydrogen chloride (1.2 mols) was collected in a water trap. The reaction mixture was poured into ice water, and extracted with ether. The ether extracts were washed with dilute sodium carbonate solution and dried over anhydrous Na$_2$SO$_4$. On distillation at pressure in the range of 3–5 mm. there were obtained about 200 g. of a crude condensate boiling in the range of about 136–151° C. The crude condensate was redistilled at pressure of about 6 mm., and there was obtained a substantially pure intermediate fraction amounting to about 95 g., having a boiling point of about 169.5° C./6 mm., B.P. corrected, 327.5° C./760 mm. Analysis work, including the following, identified the recovered material as bis-(dichloro-tetrafluoroisopropyl) phthalate.

*Analysis:* Calculated—C, 31.6; H, 1.14; F, 28.6; Cl, 26.7. Found—C, 31.3; H, 1.32; F, 30.8; Cl, 26.2.

Comparative Shell four-ball wear tests of the phthalate diester demonstrate that wear scar diameters for the diester at 4, 10 and 40 kg. are in the normal range for ester lubricants.

In the appended claims, pressure is given as pounds per square inch gauge, and unless otherwise noted, "CClF$_2$.CH(OH).CClF$_2$"

is intended to include the anhydrous material and the hydrate.

We claim:

1. The process for making CClF$_2$.CH(OH).CClF$_2$ which comprises subjecting CClF$_2$.CO.CClF$_2$ to the action of hydrogen at temperatures substantially in the range of 20–100° C. and in the presence of platinum oxide-platinum black catalyst in amount substantially in the range of 0.5–3.0% by weight based on the weight of the $CClF_2.CO.CClF_2$ charged, and at superatmospheric pressure substantially in the range of 60–150 lbs.; quantity of hydrogen and reaction time each being high enough to effect substantial reaction of $CClF_2.CO.CClF_2$ and hydrogen, temperature and pressure being correlated to maintain $CClF_2.CO.CClF_2$ and reaction product substantially in liquid phase, and recovering from the resulting reaction mass liquid material boiling substantially in the approximate range of 103–113° C. at substantially atmospheric pressure, and containing $CClF_2.CH(OH).CClF_2$.

2. The process of claim 1 in which the said liquid material is distilled in the presence of a dehydrating agent and there is recovered as condensate a liquid boiling at approximately 111–112° C. at substantially atmospheric pressure and consisting substantially of $$CClF_2.CH(OH).CClF_2$$

3. The process for making $CClF_2.CH(OH).CClF_2$ which comprises subjecting $CClF_2.CO.CClF_2$ to the action of hydrogen at temperature substantially in the range of 10–100° C. and in the presence of platinum oxide-platinum black catalyst in amount substantially in the range of 0.25–5.0% by weight, based on the weight of the $CClF_2.CO.CClF_2$ charged, and at superatmospheric pressure not substantially above 250 lbs. but at least high enough to maintain $CClF_2.CO.CClF_2$ and reaction product substantially in liquid phase; quantities of hydrogen and catalyst, and temperature and reaction time each being high enough to effect substantial reaction of $$CClF_2.CO.CClF_2$$

and hydrogen to form $CClF_2.CO(OH).CClF_2$.

4. The process of claim 3 in which temperature is not less than about 20° C., and temperature and pressure substantially in the range of 30–250 lbs. are correlated so as to maintain $CClF_2.CO.CClF_2$ and reaction product substantially in liquid phase.

References Cited by the Examiner

Swarts: Chem. Abs., vol. 23 (1929), pp. 4440–1, Qd1A51.

Smith et al.: Ind. and Eng. Chemistry, vol. 49 (1957), pp. 1241 to 1246 (page 1244 relied upon), TP1A58.

LEON ZITVER, *Primary Examiner.*

CHARLES B. PARKER, *Examiner.*